Aug. 24, 1943.   H. S. ACKERMAN   2,327,690
CONTROL APPARATUS
Filed Nov. 19, 1940
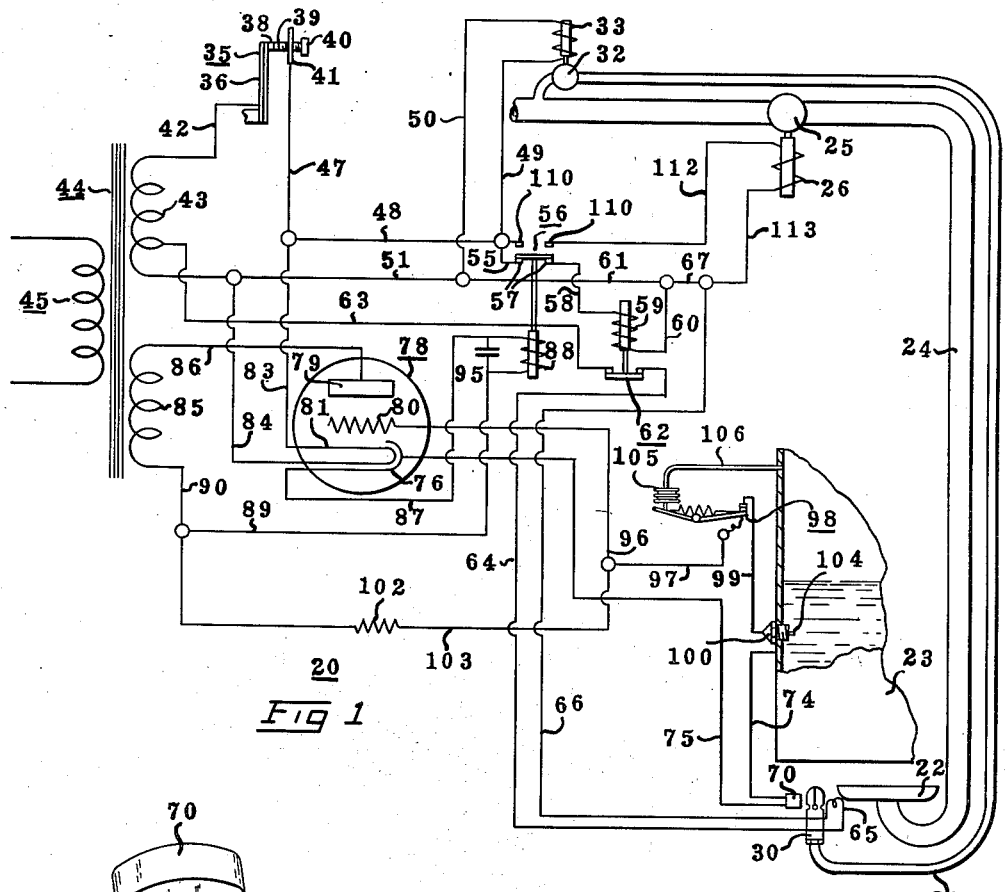
Fig 1
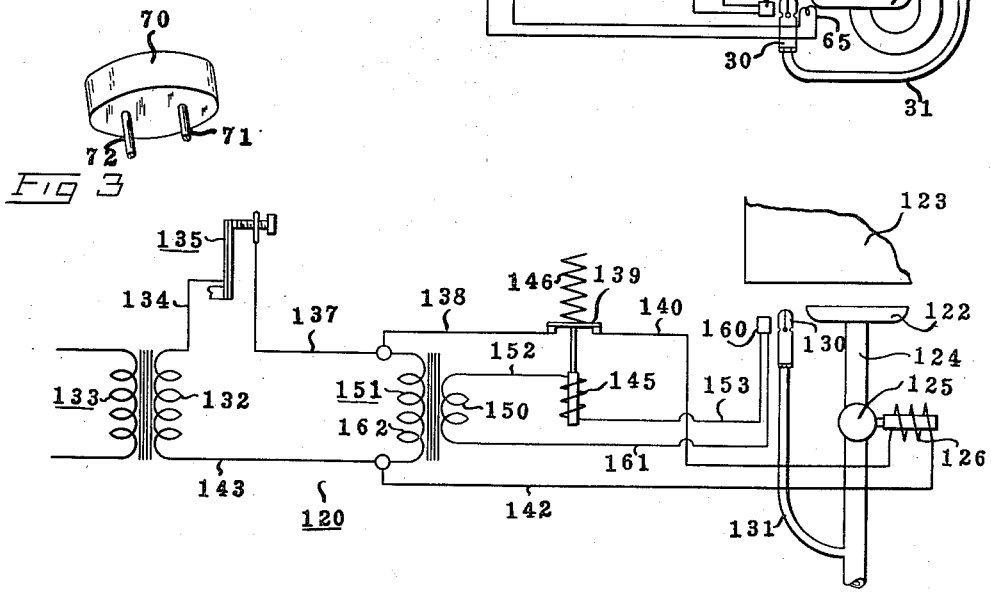
Fig 3
Fig 2
INVENTOR
Harold S. Ackerman
BY
ATTORNEY Patented Aug. 24, 1943

2,327,690

UNITED STATES PATENT OFFICE 2,327,690

CONTROL APPARATUS

Harold S. Ackerman, Pittsburgh, Pa., assignor to Hubbard and Company, Pittsburgh, Pa., a corporation of Pennsylvania Application November 19, 1940, Serial No. 366,281

2 Claims. (Cl. 158—28)

The present invention relates to control apparatus and is particularly applicable to control apparatus for fuel burners.

An object of my invention is to control the flow of fuel to a fuel burner by an electrically controlled device, which device is controlled by a circuit that includes an element connected therein and which has the property of varying in electrical resistance as the temperature thereof varies and which is arranged to be subjected to heat of combustion at the burner for controlling the device for causing the fuel supply to be cut off in the event that combustion fails to occur, for any reason.

Another object of the invention is to provide a controller for a fuel feeding device, which controller is controlled by a circuit including a cathode and plate of an electron tube, the flow of current between the cathode and plate being controlled by a grid, and the potential on the grid being controlled by a circuit controlling device that is responsive to the heat of combustion at the fuel burner.

It is also an object of the invention to provide a device for determining the presence of a fluid, which device comprises an electrically operated mechanism having a circuit therefor that includes a cathode and plate of an electron tube, the circuit being controlled by a grid between the cathode and plate, and the potential on the grid being controlled by a circuit having electrodes arranged to be subjected to the fluid to be detected.

Still another object of the invention is to provide a mechanism for determining a predetermined liquid level, which mechanism includes an electrically responsive device controlled by a circuit including the cathode and plate of an electron tube, the flow of current between the cathode and plate being controlled by a grid, and the voltage on the grid being controlled by a circuit including an electrode disposed in the liquid at the level to be determined and a second electrode disposed in the liquid below the level.

Other and further objects and advantages will be apparent from the following description, reference being had to the accompanying drawing wherein preferred forms of embodiments of the present invention are clearly shown.

In the drawing:

Fig. 1 is a diagrammatic view of the improved control system for controlling the flow of gas to a gas burning boiler;

Fig. 2 is a diagrammatic view showing a modification of the improved control system for controlling a gas burning boiler; and Fig. 3 is a perspective view, but on a larger scale, of an element of the control system shown in Figs. 1 and 2.

Referring to the drawing, for the purpose of illustrating one form of the invention I have shown a control system 20 for controlling the flow of fuel to a burner and for igniting the same. In the particular embodiment shown, a gas fuel burner is illustrated but it is to be understood that other types of burners or fuels may be employed. The fuel burner is shown at 22 and it is adapted to heat water in a boiler 23, part of the boiler being shown directly over the burner. The water heated in the boiler 23 may be utilized for heating rooms in a building. The burner is connected with a gas main by a pipe 24 and a valve 25 is connected in the pipe for controlling the flow of fuel to the burner. The valve 25 is opened by a solenoid 26 when the solenoid is energized and is arranged to be closed automatically when the solenoid is deenergized.

A pilot burner 30 is disposed adjacent the burner 22 and is arranged to direct a flame over the top of the burner 22 for igniting the fuel. The pilot burner 30 is connected to the fuel pipe 24 ahead of the valve 25 by a pipe 31 and a fuel valve 32 is connected in the pipe 31. The valve 32 is opened by a solenoid 33 when the solenoid is energized and is arranged to close automatically when the solenoid is deenergized.

The operation of the burners 30 and 22 is controlled by a thermostat switch 35 that is responsive to the temperature in a room to be heated by the water heated in the boiler 23. The thermostatic switch 35 may be of any suitable type in common use, and in the present embodiment it comprises a bimetal strip 36 anchored at one end and carrying a contact 38 at the opposite end, which contact is arranged to engage a relatively stationary contact 39. The contact 39 is mounted on a screw 40 that is threaded in a bracket 41. A wire 42 connects the bimetal 36 with a secondary coil 43 of a transformer 44. The primary coil 45 of the transformer 44 is connected in a high voltage circuit, for example, 110 volts and is energized constantly. The voltage induced in the secondary winding is preferably 24 v. The bimetal 36 is adapted to close contacts 38 and 39 when the temperature of the room in which it is located falls to, for example, 70° F. and to open the contacts when the temperature increases slightly.

When the contact 38 and 39 of the thermostatic switch 35 close, a circuit is established from secondary coil 43 through wire 42, bimetal 36, contacts 38 and 39, screw 40, bracket 41, wires 47, 48 and 49, solenoid 33 and wires 50 and 51, and coil 43. The solenoid 33, being energized, opens the valve 32 for feeding gas to the pilot burner 30. A circuit is also established from wire 48 through wire 55, switch 56, including contacts 57, wire 58, solenoid 59, wires 60, 61 and 51. The solenoid 59, when energized by completion of the above described circuit, closes a switch 62. The closure of switch 62 completes a circuit from the secondary coil 43 through wire 63, switch 62, wire 64, heating element 65, wires 66, 67, 61 and 51 to secondary coil 43. The wire 63 taps the secondary coil 43 intermediate the ends thereof for producing a voltage of 4 v. in the heating element circuit. The heating element 65 is formed by a coil of nichrome wire and it is arranged to ignite fuel issuing from the pilot burner 30.

The flames from the pilot burner are adapted to heat an element 70 positioned adjacent the burner. The element 70 is composed of material known commercially as Insulcon, manufactured by Stupekoff Laboratories, Inc., Pittsburgh, Pa. This material has a very high electrical resistance when at atmospheric temperatures, but when the temperature thereof is raised considerably, its electrical resistance decreases materially. I make use of this characteristic of the material for causing the fuel valve 25 to be opened after the gas at the pilot burner has become ignited and for causing the valve 25 to close in the event the pilot should be extinguished, for any reason. The element 70 is formed by embedding two wires 71 and 72, preferably formed of platinum, in a small biscuit of Insulcon, these wires being spaced apart so that the resistance of the Insulcon controls the circuit between the wires. This element is then mounted adjacent the pilot burner 30 in a position where it will be subject to heating by the radiation from the path of a flame issuing from the burner. The wire 71, for example, is connected to a wire 74 that is grounded to the boiler 23, and the wire 72 is connected to a wire 75 connected with the cathode 76 of an electron tube 78.

The electron tube 78 may be a number "46" or "25A6" and it includes the cathode 76, plate 79, grid 80 and heater 81 for the cathode. The heater 81 is connected in the circuit of the secondary coil 43 by wires 83 and 84. Thus the heater 81 is energized when the thermostatic switch 35 closes the secondary circuit. The plate 79 is connected to a second secondary coil 85 of the transformer 44 by a wire 86. Preferably, the coil 85 is such that 60 v. is induced in the circuit therefor. The cathode 76 is connected to the opposite side of the secondary coil 85 by a circuit including wire 87, solenoid 88 and wires 89 and 90. The resistance of the solenoid is 2500 ohms. A condenser 95 is connected with wires 87 and 89 in parallel with the solenoid 88. The condenser has a capacity of 25 m. f. The grid 80 is connected to the wire 74 by a circuit that includes wires 96 and 97, switch 98, wire 99, plug 100, water in the boiler, and boiler plate to wire 74. A resistance element 102 having a value of five hundred thousand ohms is connected in wire 103 between wires 90 and 96.

The plug 100 comprises a tubular, metallic member having an electrode 104 disposed on the inside thereof and insulated therefrom by waterproof material. The plug is threaded in an opening in the wall of the boiler at the minimum water level desired. One end of the electrode 104 extends inside the boiler, and the wire 99 is connected to the opposite end of the electrode.

The switch 98 is adapted to be snapped to the open and closed position by a bellows 105 that is connected with the interior of the boiler 23 by a tube 106. When the pressure in the boiler exceeds a predetermined amount, the bellows expands to move a snap mechanism for causing the switch to be opened, and when the pressure recedes, the snap mechanism is operated by the collapsing of the bellows to close the switch.

The solenoid 88 is adapted, when energized, to move the switch 56 to bridge contacts 110 for establishing a circuit through the solenoid 26 from wire 48, contacts 110, wire 112, solenoid 26, wires 113, 67, 61, 51, secondary coil 43, thermostatic switch 35 and wires 47 and 48. When the switch 56 is moved by the solenoid 88 to bridge contacts 110, contacts 57 are opened and the solenoid 59 is deenergized. The switch 62 is arranged to open automatically when the solenoid 59 is deenergized for breaking the circuit for the heater element 65.

The operation of the system is as follows: When the thermostatic switch is above 70° F., solenoids 26 and 33 of fuel valves 25 and 32, respectively, are deenergized and the valves are closed. Solenoid 59 is also deenergized and switch 62 is therefore open. Solenoid 88 is also deenergized and the switch 56 is in the position to bridge contacts 57. When the thermostatic switch 35 closes, the solenoid 33 is energized and opens valve 32 and gas is fed to the pilot burner 30. Solenoid 59 is also energized and closes switch 62 for completing the circuit for the heater element 65. The heater 81 of the electron tube 78 is also energized to heat the cathode 76. After a second or so of such closure of switch 62, the element 65 will ordinarily ignite the gas flowing from the pilot burner 30 and the flame resulting from such ignition and the continued combustion of the gas being jetted from the burner constitutes a radiant heater the radiation from which heats the element 70. As the temperature of the element 70 is thus raised, the resistance through the element decreases until an electrical circuit is established from the grid 80 through wires 96, 97, switch 98, wire 99, plug 100, water and boiler, wire 74, element 70 and wire 75 to the cathode 76. This circuit reduces the potential on the grid to permit a flow of current to the plate 79 from the cathode for establishing a circuit from secondary coil 85 through wires 90, 89, solenoid 88, wire 87, cathode 76, plate 79, and wire 86 to secondary coil 85. The solenoid 88, being energized, moves the switch 56 to bridge contacts 110 for completing the circuit of the solenoid 26 and opens contacts 57 to deenergize the solenoid 59. The solenoid 26 opens the gas valve 25 for feeding gas to the burner 22, which gas is ignited by the flame from the pilot burner 30. The deenergization of solenoid 59 opens switch 62 for deenergizing the heating element 65.

In case the pilot flame fails to ignite for any reason, the element 70 remains at room temperature and, having extremely high electrical resistance at such temperature, prevents a reduction in the normal negative charge built up on the grid 80 so that current sufficient to energize the solenoid 88 is prevented from flowing to the plate 79. This condition of plate-current blocking exists on initial failure of pilot-burner lighting, and also in the event of failure of combustion after ignition has once occurred. In the latter case, solenoid 88 is deenergized and the circuit for solenoid 26 is deenergized by movement of the switch 56 from contacts 110. Deenergization of the solenoid 26 causes the valve 25 to terminate the flow of fuel to the burner 22.

When the water is above the electrode 104, the water forms a path for the current of the grid circuit from the electrode to the boiler wall. If the water level should fall below the electrode 104, the circuit from the grid 80 to the cathode 76 will be broken and the potential on the grid will cause a reduction in the flow of current from the cathode to the plate and the solenoid 88 will be deenergized to cause the switch 56 to open the contacts 110 in the circuit for solenoid 26. This causes deenergization of the solenoid 26 and the fuel valve 25 closes automatically. This arrangement for determining the level of the water will not produce any appreciable electrolysis in the boiler 23 because the current through the water is practically immeasurable. Thus, when water is absent from the end of the electrode 104, the circuit for the grid 80 is broken and causes the burner 22 to be shut off.

When the pressure in the boiler 23 exceeds a predetermined amount, the switch 98 is opened and the potential on the grid causes the current flow through the circuit of the solenoid 88 to be reduced so that the switch 56 moves from contacts 110 to contacts 57 for breaking the circuit to the solenoid 26 of the gas valve 25. This causes the valve 25 to close automatically. Thus the gas burner 22 will be rendered inoperative when the pressure in the boiler is excessive. When the pressure is reduced to a predetermined degree, the switch 98 is reclosed by collapsing of the bellows 105 and normal operation of the control system will be resumed.

When the temperature of the thermostatic switch 35 is raised to that desired, the thermostat breaks the circuits of the solenoids 26 and 33, causing valves 25 and 32 to close, and deenergizes the heater 81 of the tube 78. This causes deenergization of the solenoid 88 and the switch 56 is moved to the contacts 57, as is shown in Fig. 1. The control system is then prepared for causing heating of the boiler 23 when the thermostatic switch 35 calls for heat.

Another embodiment of the invention is shown in Fig. 2, wherein a control system 120 is shown for controlling the flow of fuel to a gas burner 122 that is arranged to heat a boiler 123. Gas is fed to the burner 122 by a pipe 124 connected to a suitable gas supply. A valve 125 is connected in the pipe 124 for controlling the flow of fuel to the burner. The valve is opened by a solenoid 126, when the solenoid is energized, and it is arranged to be closed when the solenoid is deenergized.

A pilot burner 130 is arranged to direct a jet of burning gas over the burner 122 for igniting the gas fed to the burner 122. The pilot burner 130 is connected to the pipe 124 by a pipe 131 and gas is fed to the burner 130 constantly, and normally, the gas is burning at all times.

The solenoid 126 is energized by a circuit including, the secondary coil 132 of a transformer 133, wire 134, thermostatic switch 135, wires 137, 138, switch 139, wire 140, solenoid 126, wires 142 and 143 which lead to the secondary coil 132. The primary coil of transformer 133 may be connected to a 110 v. circuit and a voltage of 24 v. is induced in the secondary coil 132.

The thermostatic switch 135 is similar to the thermostatic switch 35, described hereinbefore, and it is arranged to be responsive to the temperature in a room heated by the water from the boiler 123. The thermostatic switch is adapted to close the circuit therethrough when the temperature falls to a predetermined low degree, for example, 70° F., and to open the circuit when the temperature increases.

The switch 139 is closed by a solenoid 145, when the solenoid is energized, and opened by a spring 146 when the solenoid is deenergized. The circuit for the solenoid 145 includes a secondary winding 150 of a transformer 151, wire 152, solenoid 145, wire 153, an Insulcon element 160 and a wire 161 which leads to the secondary coil 150. The primary coil 162 of the transformer 151 is connected between wires 137 and 143. The element 160 is similar to the element 70 described hereinbefore, and it is arranged to be heated by the burning gas at the pilot burner 130.

The operation of the system is as follows: when the fuel at the pilot burner 130 is burning, the resistance through the element 160 is very low. As the temperature at the thermostatic switch 135 falls to 70° F., the circuit therethrough is closed and transformer 151 is energized. Since the element 160 is heated, the secondary circuit of the transformer 151 is completed and the solenoid 145 is energized to close the switch 139 for completing the circuit to the solenoid 126. The solenoid 126 opens valve 125 and fuel is fed to the burner 122. When the temperature at the thermostatic switch 135 is raised to that desired, the circuit therethrough is broken, causing the transformer 151 and the solenoid 126 to be deenergized. Valve 125 is automatically closed when solenoid 126 is deenergized.

If the flame at the pilot has become extinguished during the time the burner 122 is inoperative, the circuit for the solenoid 145 cannot be completed due to the high resistance in the element 160 and therefore switch 139 cannot be closed and consequently, although there is a demand for heat by the thermostatic switch 135, valve 125 will remain closed.

If the flame at the pilot burner becomes extinguished during operation of the burner 122, the element 160 cools and its increased resistance substantially deenergizes the solenoid 145 and the switch 139 is opened by the spring 146 for interrupting the circuit to solenoid 126. This causes the fuel valve 125 to close.

By utilizing an element whose resistance varies with its temperature, I have provided a novel control system for controlling the flow of fuel to a fuel burner that operates to shut off the fuel supply when combustion will not occur or when it fails at the burner.

Also, by controlling the potential on the grid of an electron tube by causing the circuit to be established through a fluid, I have provided an instrument for determining the presence or absence of a fluid.

While the forms of embodiments of the present invention as herein disclosed constitute preferred forms it is to be understood that other forms might be adopted, all coming within the scope of the claims which follow.

I claim:
1. In a burner control system, a pilot burner, a main burner adjacent thereto and ignitable therefrom, electrically-operable means for effecting supply of fuel to said main burner, a source of electrical current, a circuit for energizing said fuel supply means from said source, said circuit including the plate, cathode, and the conductive space of an electron tube, and means for blocking the supply of fuel to said main burner in the absence of a state of combustion in proximity thereto, said last-mentioned means comprising a grid element associated with the recited elements of said electron tube and effective to suppress the conductivity of said circuit through said tube space to a value insufficient to effect operation of said fuel supply means, and means for rendering said grid element ineffective to so suppress conductivity of said circuit during the evolution of heat by burner operation, said last-recited means comprising a grid-discharge circuit including a heat-absorbing member mounted adjacent said burners and subject to heating by the thermal radiation from combustion thereat, said heat-absorbing member being formed of thermo-sensitive material having adequate electrical conductivity for such grid discharge when but only when so heated.

2. In a burner control system, a pilot burner, a main burner adjacent thereto and ignitable therefrom, electrically-operable means for effecting supply of fuel to said main burner, a source of electrical current, a circuit for energizing said fuel supply means from said source, said circuit including the plate, cathode, and the conductive space of an electron tube, and means for blocking the supply of fuel to said main burner in the absence of a state of combustion in proximity thereto, said last-mentioned means comprising a grid element associated with the recited elements of said electron tube and effective to suppress the conductivity of said circuit through said tube space to a value insufficient to effect operation of said fuel supply means, and means for rendering said grid element ineffective to so suppress conductivity of said circuit during the evolution of heat by burner operation, said last-recited means comprising a grid-discharge circuit including an electrical resistor element per se inadequate to discharge said grid element and a heat-absorbing member connected in shunt with said resistor element, mounted adjacent said burners and subject to heating by the thermal radiation from combustion thereat, said heat-absorbing member being formed of thermo-sensitive material having adequate conductivity to effect such grid discharge in cooperation with said shunted resistor element when but only when so heated.

HAROLD S. ACKERMAN.